US006732844B2

(12) United States Patent
Muramatsu

(10) Patent No.: US 6,732,844 B2
(45) Date of Patent: May 11, 2004

(54) RATCHET ONE-WAY CLUTCH AND STATOR USING RATCHET ONE-WAY CLUTCH

(75) Inventor: Kazuhiko Muramatsu, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/238,775

(22) Filed: Sep. 11, 2002

(65) Prior Publication Data

US 2003/0047401 A1 Mar. 13, 2003

(30) Foreign Application Priority Data

Sep. 13, 2001 (JP) .......................... 2001-277374

(51) Int. Cl.$^7$ ............................................. F16D 41/12
(52) U.S. Cl. ................. 192/46; 192/55.61; 192/113.32; 60/345
(58) Field of Search ............... 192/46, 55.61, 192/113.32, 212; 60/345

(56) References Cited

U.S. PATENT DOCUMENTS 6,062,362 A * 5/2000 Costin et al. ............... 192/46
6,557,681 B2 * 5/2003 Kinoshita et al. ........... 192/46
6,612,107 B2 * 9/2003 Sato ............................ 60/345
2002/0063029 A1 * 5/2002 Eidam et al. ................ 192/46

* cited by examiner

Primary Examiner—Richard M. Lorence
(74) Attorney, Agent, or Firm—Miles & Stockbridge P.C.

(57) ABSTRACT

The present invention provides a ratchet one-way clutch comprising an inner race, outer race disposed for a relative rotation respect to the inner race and in concentric with the latter, recessed portions formed in one of an outer periphery of the inner race and an inner periphery of the outer race along a circumferential direction, pawl members formed on the other of the outer periphery of the inner race and the inner periphery of the outer race and adapted to be fitted into the recessed portions, springs for biasing the pawl members toward the recessed portions, and pockets for containing the pawl members and the springs, and wherein a discharge path is formed in the outer race, or a stator using such a ratchet one-way clutch.

14 Claims, 14 Drawing Sheets

RATCHET ONE-WAY CLUTCH AND STATOR USING RATCHET ONE-WAY CLUTCH

BACKGROUND OF THE INVENTION

1. Field of the Invention

The present invention relates to a ratchet one-way clutch used in an automatic transmission, a building machine, an agricultural machine and the like, and a stator using such a ratchet one-way clutch.

2. Related Background Art

FIG. 16 is a front view of a stator 101 having a conventional ratchet one-way clutch.

Now, a construction of such a stator 101 will be explained. The stator 101 comprises a vane wheel 107 and a one-way clutch 115 disposed inside the vane wheel 107.

The ratchet one-way clutch 115 incorporated into the stator 101 includes an inner race 102, an outer race 103 disposed for relative rotation with respect to the inner race 102 and concentric with the latter, pawl members 104 housed in pockets 112 of the outer race 103 and adapted to transmit torque, and biasing springs 105 for biasing the respective pawl members 104 radially inwardly, and the inner race 102 is provided at its outer periphery with recessed portions 106 into which the pawl members 104 can fit.

Further, the outer race 103 is provided at its inner periphery with stress relieving recessed portion 130 for dispersing stress generated when the pawl members 104 fit into the recessed portions 106.

The outer race 103 directly abuts against an outer peripheral surface and side surfaces of the inner race 102, so that relative rotation between the outer race 103 and the inner race 102 is permitted. The inner race 102 and the outer race 103 include portions having a sliding bearing function.

First recessed portions 119 for containing damper springs 108 are formed in an outer peripheral surface of the outer race 103 equidistantly along a circumferential direction, and recessed portions 129 corresponding to the first recessed portions are formed in an inner peripheral surface of the vane wheel 107 equidistantly along the circumferential direction. Each of the damper springs 108 extends in the circumferential direction and has one end abutting against a side wall of the first recessed portion 119 provided in the outer race 103 substantially perpendicular to the circumferential direction and the other end abutting against a side wall of the recessed portion 129 provided in the vane wheel 107 substantially perpendicular to the circumferential direction.

Further, second recessed portions 110 are formed in the outer peripheral surface of the outer race 103. Projections 109 which can protrude into the second recessed portions 110 are provided on an inner peripheral surface of the vane wheel 107 at positions corresponding to the second recessed portions 110. When the vane wheel 107 is rotated relatively with respect to the outer race 103, the damper springs 108 are flexed, and, before contraction permitting amounts of the damper springs 108 are reached, the projections 109 of the vane wheel 107 abut against the second recessed portions 110. Thus, flexed amounts of the damper springs 108 are limited, thereby preventing yielding and damage of the damper springs 108. Namely, a damper mechanism 116 is constituted by the first and second recessed portions of the outer race 103 and the recessed portions 129 and the projections 109 of the vane wheel.

With the above-mentioned arrangement, shock generated when the pawl members 104 of the one-way clutch 115 are fitted into the recessed portions 106 of the inner race 102 is transmitted from the outer race 103 to the damper springs 108 and is absorbed by the damper springs 108. Even if the shock generated when the pawl members 104 are fitted into the recessed portions 106 is so great that it cannot be absorbed by the springs, the second recessed portions 110 of the outer race 103 lock the projections 109 of an inner ring 117, thereby limiting the flexed amounts of the damper springs 108. Thus, the yielding and damage of the damper springs 108 can be prevented.

In the stator having the above-mentioned ratchet one-way clutch 115, when a direction of the relative rotation between the inner race 102 and the outer race 103 is a direction for achieving engagement of the pawl members 104, the torque is transmitted; whereas, then the direction is a direction for not achieving engagement of the pawl members 104, idle rotation is generated, with the result that the torque is not transmitted.

In the above-mentioned conventional stator, because of wear due to a sliding movement between the pawl member and the outer race and wear of bearing mechanisms constructed between the inner race and the outer race and between the inner race and the vane wheel, there was a tendency that metallic powder generated by the wear of various parts and foreign maters such as dirt are accumulated within the one-way clutch for example, within the stress relieving recessed for relieving the stress generated by the engagement of the pawl members.

If the foreign matters exist within the one-way clutch or the stator, not only an operation of the one-way clutch or the stator may be obstructed, but also various parts constituting the one-way clutch or the stator may be damaged.

SUMMARY OF THE INVENTION

An object of the present invention is to a stator in which metallic powder generated by wear of bearing mechanisms between pawl members and an outer race and between an inner race and the outer race and between the inner race and a vane wheel and foreign matters such as dirt within a ratchet one-way clutch of the stator are discharged outside, thereby preventing a poor operation.

Another object of the present invention is to provide a stator in which a good assembling ability for damper springs can be achieved.

To achieve the above objects, according to one aspect of a one-way clutch of the present invention, there is provided a ratchet one-way clutch comprising an inner race, an outer race disposed for a relative rotation respect to the inner race and in concentric with the latter, a recessed portion formed in one of an outer periphery of the inner race and an inner periphery of the outer race along a circumferential direction, a pawl member formed on the other of the outer periphery of the inner race and the inner periphery of the outer race and adapted to be fitted into the recessed portion, a spring for biasing the pawl member toward the recessed portion, and a pocket for containing the pawl member and the spring, and wherein a discharge path is formed in the outer race.

Since the discharge path is formed in the outer race, metallic powder generated by wear between various member constituting the one-way clutch can be discharged.

According to another aspect of the one-way clutch of the present invention, the discharge path is a groove extending in a radial direction of the outer race.

According to a further aspect of the one-way clutch of the present invention, the discharge path is communicated with a recess for relieving stress provided in an inner periphery of the outer race.

According to a still further aspect of the one-way clutch of the present invention, the discharge path is a hole passing through the outer race in an axial direction.

According to a further aspect of the one-way clutch of the present invention, there are provided an inner race, an outer race disposed for a relative rotation respect to the inner race and in concentric with the latter, a recessed portion formed in one of an outer periphery of the inner race and an inner periphery of the outer race along a circumferential direction, a pawl member formed on the other of the outer periphery of the inner race and the inner periphery of the outer race and adapted to be fitted into the recessed portion, a spring for biasing the pawl member toward the recessed portion, a pocket for containing the pawl member and the spring, and a pocket formed in an outer periphery of the outer race and adapted to contain a damper spring, and the pocket for containing the damper spring is provided with an assembling window passing through the outer race in an axial direction.

According to a still further aspect of the one-way clutch of the present invention, the discharge path is further communicated with the pocket for containing the damper spring or a groove formed in the outer peripheral surface of the outer race.

According to the other aspect of the one-way clutch of the present invention, the outer race is made of aluminium.

Further, the stator of the present invention uses the ratchet one-way clutch according to any one of the above-mentioned aspects.

In addition, the stator of the present invention includes a vane wheel having a discharge path.

The discharge path formed in the vane wheel of the present invention is a hole passing through the vane wheel in an axial direction.

DETAILED DESCRIPTION OF THE PREFERRED EMBODIMENTS

A one-way clutch according to an embodiment of the present invention comprises an inner race, an outer race disposed for a relative rotation respect to the inner race and in concentric with the latter, recessed portions formed in one of an outer periphery of the inner race and an inner periphery of the outer race along a circumferential direction, pawl members provided on the other of the outer periphery of the inner race and the inner periphery of the outer race and adapted to be fitted into the respective recessed portions, springs for biasing the pawl members toward the recessed portions, and pockets for containing the respective pawl members and the springs, and a discharge path for discharging foreign matters is formed in the outer race. The discharge path is communicated with stress relieving recesses formed in the outer race.

The foreign matters such as metallic powder collected and accumulated in the stress relieving recesses of the one-way clutch can be discharged out of the clutch through the discharge path.

In a stator using the one-way clutch having the above-mentioned construction, a discharge path is provided in a vane wheel constituting the stator. The discharge path is provided to be communicated with the stress relieving recesses. The foreign matters such as metallic powder accumulated in the stress relieving recesses of the one-way clutch can be discharged out of the stator through the discharge path.

In the specification, a term "foreign matters" means substances entered into the one-way clutch and the stator or generated in the one-way clutch and the stator and may include metallic powder, dust, powder dust, dirt and the like, for example.

In the specification, a term "assembling window" means an opening portion provided in a member, and circumference of the window is not limited to a closed space, and a notch partially opened is also included.

[Embodiment]

Figure 1:
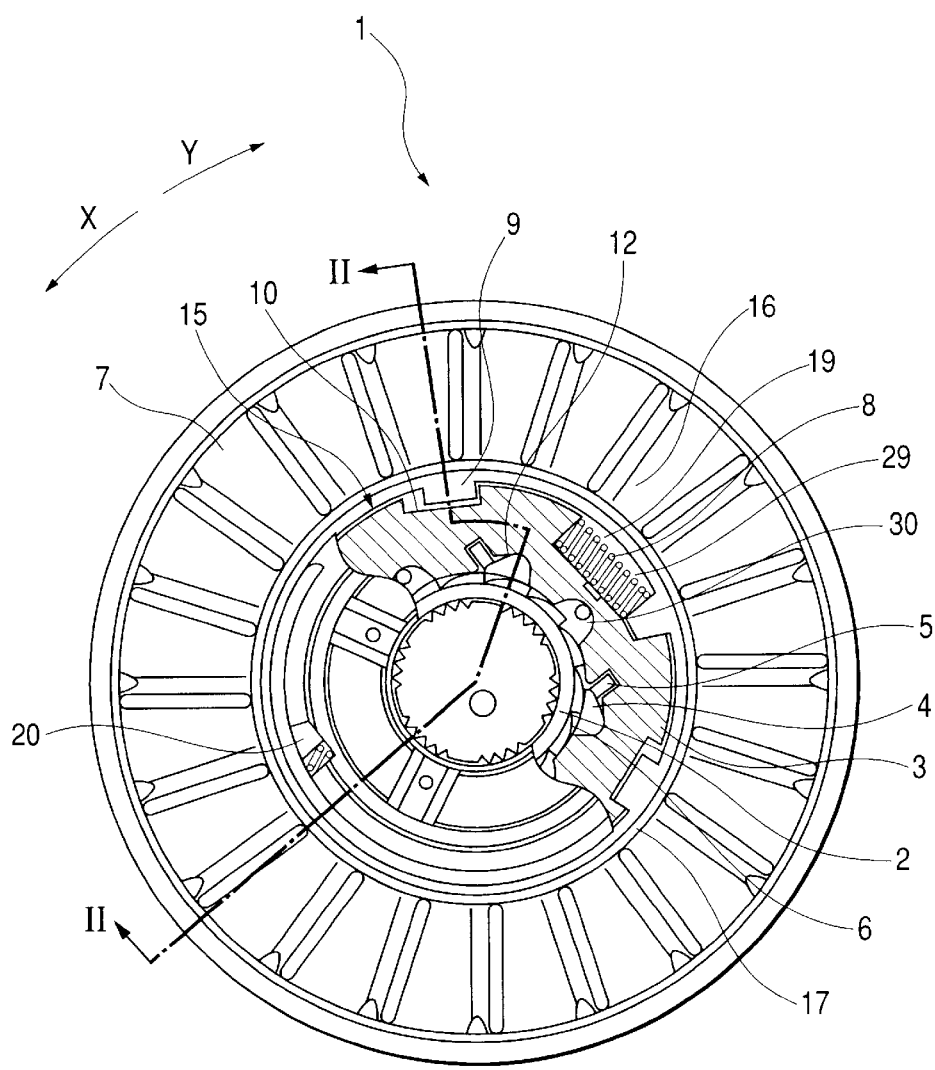
FIG. 1 is a partial sectional view of a stator of the present invention, looked at from a front side.
Figure 2:
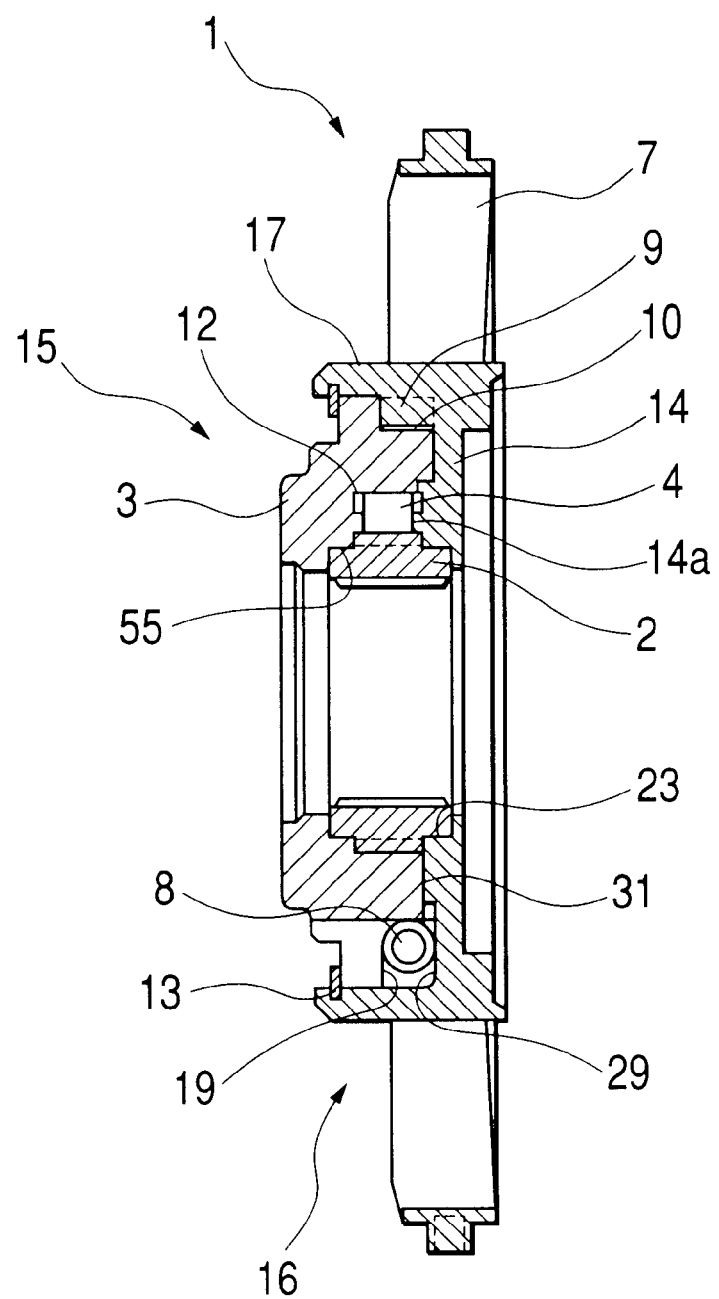
FIG. 2 is a sectional view taken along the line II-O-II in FIG. 1.

FIGS. 1 to 12 show an embodiment of the present invention. Incidentally, the same elements are designated by the same reference numerals. FIG. 1 is a partial sectional front view of a stator, and FIG. 2 is a sectional view taken along the line II-O-II in FIG. 1.

A stator 1 comprises a vane wheel 7, a ratchet one-way clutch 15 disposed within the vane wheel 7, and a damper mechanism 16 provided between the vane wheel 7 and the one-way clutch 15.

First of all, the ratchet one-way clutch disposed within an inner ring 17 in the vane wheel 7 will be explained.

The ratchet one-way clutch 15 comprises an inner race 2 capable of being spline-fitted onto a stator shaft (not shown) and an outer race 3 disposed for a relative rotation with respect to the inner race 2 and in concentric with the latter and arranged at an outer side of the inner race, and recessed portions 6 are formed in an outer peripheral surface of the inner race 2 equidistantly along a circumferential direction, and pawl members 4 contained in pockets 12 provided in an inner periphery of the outer race 3 are engaged by the recessed portions 6. Further, springs 5 for biasing the pawl members 4 toward an outer periphery of the inner race 2 are disposed within the pockets 12.

With the above-mentioned arrangement, in the ratchet one-way clutch 15, when the inner race 2 is rotated in an anti-clockwise direction (shown by the arrow X) or the outer race 3 is rotated in a clockwise direction (shown by the arrow Y), the pawl members 4 are rotated idly without being fitted into the recessed portions 6.

On the other hand, when the inner race 2 is rotated in the clockwise direction (shown by the arrow Y) or the outer race 3 is rotated in the anti-clockwise direction (shown by the arrow X), the pawl members 4 are fitted into the recessed portions 6, with the result that torque is transmitted between the inner race 2 and the outer race 3.

Next, the damper mechanism 16 for absorbing shock generated when the pawl members 4 of the one-way clutch 15 is fitted or engaged will be explained. First recessed portions 19 for containing damper springs 8 are formed in an outer peripheral surface of the outer race 3 equidistantly along a circumferential direction, and, in correspondence to the first recessed portions, recessed portions 29 are formed in an inner peripheral surface of the vane wheel 7 equidistantly along the circumferential direction. Each damper spring 8 extends in the circumferential direction and has one end abutting against a side wall (substantially perpendicular to the circumferential direction) of the first recessed portion 19 provided in the outer race 2 and the other end abutting against a side wall 20a (FIG. 9) (substantially perpendicular to the circumferential direction) of the recessed portion 29 provided in the vane wheel 7.

Further, second recessed portions 10 are formed in the outer peripheral surface of the outer race 3, and projections 9 provided on an inner peripheral surface of the inner ring 17 protrude into the second recessed portions 10, and the projection and the second recessed portion have complementary shapes with respect to each other. A circumferential length of the second recessed portion 10 is greater than that of the projection 9 and is smaller than a circumferential length of the first recessed portion. Thus, when the outer race 3 is rotated relative to the vane wheel 7, although the damper springs 8 are flexed, before a contraction permitting amount of the damper spring 8 is reached, the projections 9 abut against the second recessed portions 10. In this way, a damper spring operation limiting portion for limiting the flexed amounts of the damper springs 8 is defined by the projections 9 and the second recessed portions 10. Further, by adjusting the circumferential lengths of the projection 9 and the second recessed portion 10, the flexed amount of the damper spring 8 can be determined. As mentioned above, the damper mechanism 16 is constituted by the first recessed portions 19 of the outer race 3, the recessed portions 29 of the vane wheel, and the damper springs 8.

With the arrangement as mentioned above, the shock generated when the pawl members of the one-way clutch are fitted into the recessed portions, is transmitted from the outer race 3 to the damper springs 8 and is absorbed by the latter. Even if the shock generated when the pawl members 4 are fitted into the recessed portions 6 is so great that it cannot be absorbed by the damper springs, the second recessed portions 10 of the outer race 3 are locked by the projections 9 of the inner ring 17, thereby limiting the flexed amounts of the damper springs 8. Thus, yielding and/or damage of the damper springs 8 can be prevented.

Now, a construction of the stator 1 will be explained with reference to FIG. 2. FIG. 2 is a sectional view of the stator 1 taken along the line II-O-II in FIG. 1.

As shown, an inner diameter portion 14 extends from the inner ring 17 of the vane wheel 7 radially inwardly so that the inner race 2 is pinched between the inner diameter portion 14 and the outer race 3 in an axial direction. Namely, the outer race 3 and the inner diameter portion 14 abut against both axial ends of the inner race 2. Further, the outer race 3 and the inner diameter portion 14 are dimensioned to have clearances so that they can slide with respect to the inner race 2.

A shifting movement of the outer race 3 constituting the one-way clutch 15 in one (left in FIG. 2) of two axial directions is limited by a snap ring 13 fitted into a groove provided in an inner peripheral surface of the inner ring 17. Further, the shifting movement of the outer ring 3 in the other axial direction (right in FIG. 2) is limited by the inner diameter portion 14.

The damper mechanism 16 is shown at a lower part in FIG. 2, and the first recessed portion 19 is defined by a surface extending in the axial direction in the sectional view, a surface extending in the redial direction, and a curved surface connecting the former two surfaces and having a predetermined radius of curvature.

Similarly, the recessed portion 29 of the vane wheel 7 constituting the damper mechanism 16 is defined by a surface extending in the axial direction in the sectional view, a surface extending in the radial direction, and a curved surface connecting the former two surfaces and having a predetermined radius of curvature.

It is desirable that each of the radius of curvatures of the curved surfaces defining the recessed portions 19, 29 coincides with radius of curvature of the damper spring 8 contained therein so that the damper spring 8 can be flexed smoothly.

Incidentally, configurations and dimensions adopted in the above-mentioned embodiment are merely examples, and it should be noted that they can be modified appropriately.

Next, various elements constituting the stator 1 will be explained with reference to FIGS. 3 to 12.

Figure 3:
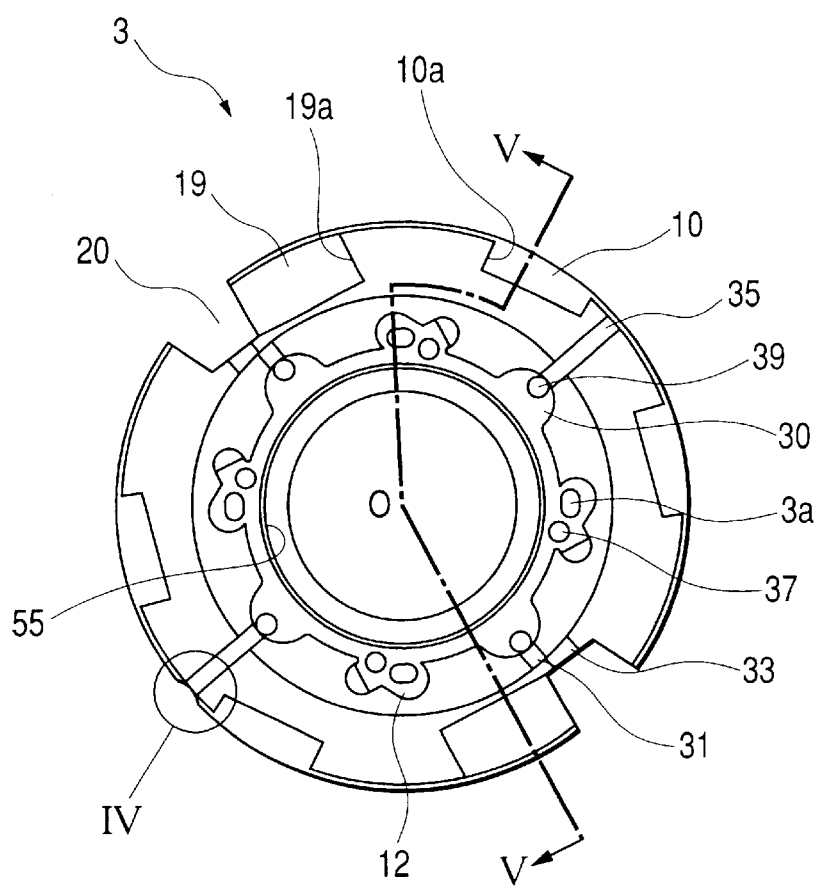
FIG. 3 is a front view of an outer race of FIG. 1.
Figure 4:
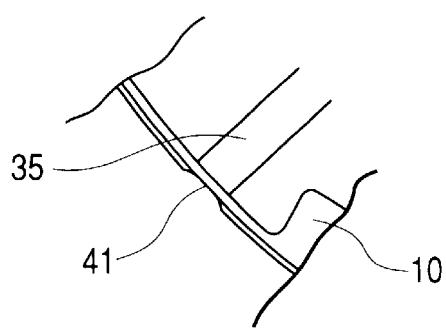
FIG. 4 is an enlarged view of a portion IV in FIG. 3.
Figure 5:
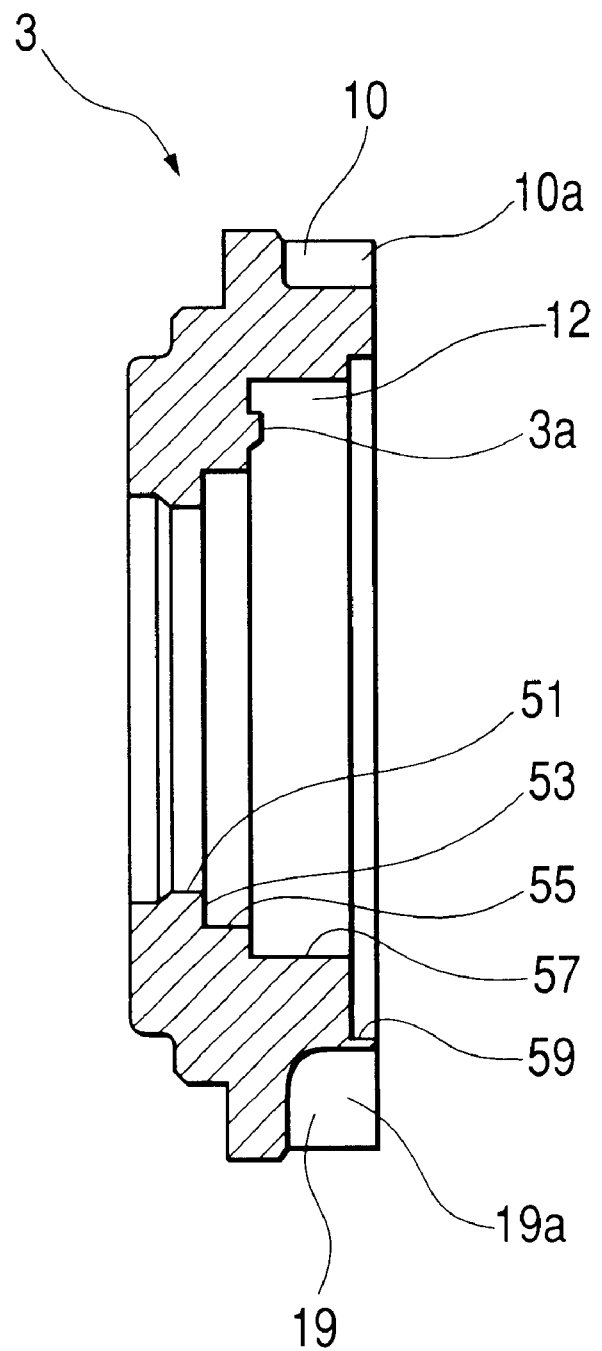
FIG. 5 is a sectional view taken along the line V-O-V in FIG. 3.

FIG. 3 is a front view of the outer race 3, FIG. 4 is an enlarged view showing IV portion in FIG. 3, and FIG. 5 is a sectional view taken along the line V-O-V in FIG. 3. The annular outer race 3 is provided at its outer periphery with a set of radially opposed first recessed portions 19. Each first recessed portion 19 is provided at its one end with an assembling window 20 as a notch.

Further, at the outer periphery of the outer race 3, between the set of first recessed portions 19, there are arranged a plurality of second recessed portions 10 equidistantly in a circumferential direction, which second recessed portions, together with the projections 9 of the vane wheel, constitute the aforementioned damper spring operation limiting portions.

The pockets 12 for containing the pawl members as the torque transmitting members and the springs and stress relieving recesses 30 are alternately formed in the inner periphery of the outer race 3 equidistantly along the circumferential direction.

An axial through-hole 37 and a projection 3a for supporting the pawl member are provided within each pocket 12. The hole 37 is communicated with the interior of the one-way clutch and acts as a lubricating oil flow path and a foreign matter discharging path.

Further, the stress relieving recess 30 is provided with a hole 39 passing through the outer race 3 in the axial direction, which hole acts as a lubricating oil flow path. A groove 31 or 35 extending radially outwardly is communicated with the hole 39.

By the way, foreign matters such as metallic pieces generated by wear of various parts are apt to be collected and accumulated in the stress relieving recesses 30. In order to discharge such foreign matters, the outer race 3 is provided with a first discharge path. The first discharge path is constituted by the grooves 31, grooves 33, first recessed portions 19 and assembling windows 20. Each groove 31 is communicated with the corresponding first recessed portion 19 through the groove 33 extending in the radial direction.

The foreign matters in the stress relieving recesses 30 are discharged out of the stator along the first discharge path.

Next, a second discharge path provided in the outer race 3 will be explained with reference to FIGS. 3 and 4. The second discharge path is constituted by the grooves 35 extending radially outwardly from the recesses 30 to the outer peripheral edge, and grooves 41 provided in the outer peripheral surface of the outer race and extending in the axial direction and communicated with the respective grooves 35. More specifically, the accumulated foreign matters are discharged from each recess 30 externally through the groove 35, the groove 41 and a gap between the outer race 3 and the snap ring 13 (refer to FIG. 2), which constitutes a part of the second discharge path.

FIG. 5 is a sectional view of the outer race 3, taken along the line V-O-V in FIG. 3. The outer race 3 is provided at its inner periphery with inner diameter portions 51, 55, 57, 59 having different inner diameters, and the pockets 12 for containing the pawl members and the springs for biasing the pawl members are formed in the inner diameter portion 57. The inner diameter portion 55, and a radially extending surface 53 connecting between the inner diameter portion 55 and the inner diameter portion 51 are sliding surfaces contacted with the inner race 2 and constitute bearing portions when the inner race and the outer race are rotated relative to each other. The inner diameter portion 55 acts as a radial bearing surface and the surface 53 acts as a thrust bearing surface. Further, shoulder portions 14b (described later) of the vane wheel 7 abut against the inner diameter portion 59 having the largest diameter.

The outer race 3 is provided at its outer periphery with the second recessed portions 10 constituting the damper spring limiting portion, and the projections 9 of the vane wheel 7 abut against surfaces 10a substantially perpendicular to the circumferential direction. The first recessed portion 19 for containing the damper spring is also shown, and one end of the damper spring can abut against a surface 19a substantially perpendicular to the circumferential direction.

Next, another embodiment of an outer race will be explained with reference to FIGS. 6 to 8. Also in another embodiment of the outer race 203, since a construction thereof is substantially the same as that of the outer race 3, only differences will be described.

Figure 6:
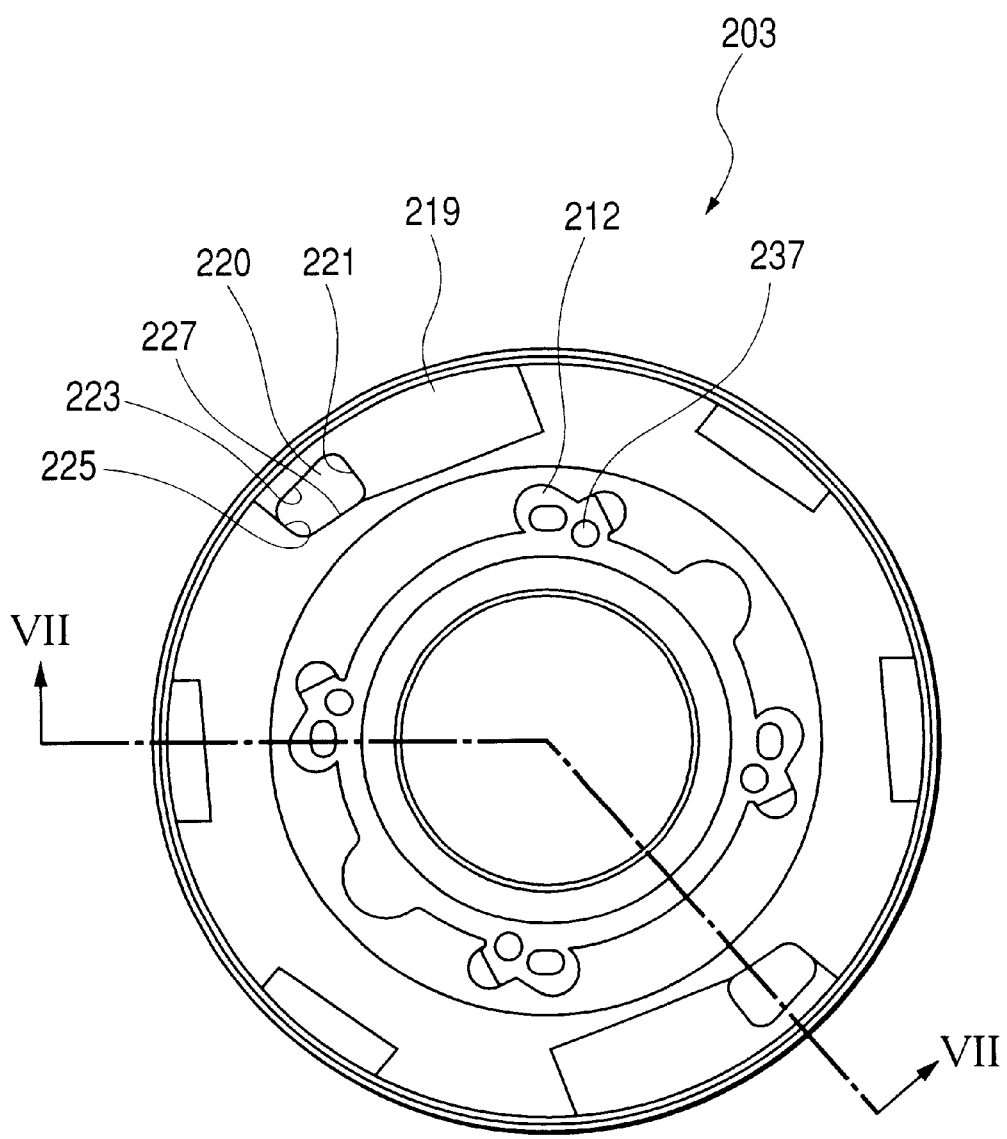
FIG. 6 is a front view of an outer race according to another embodiment.
Figure 7:
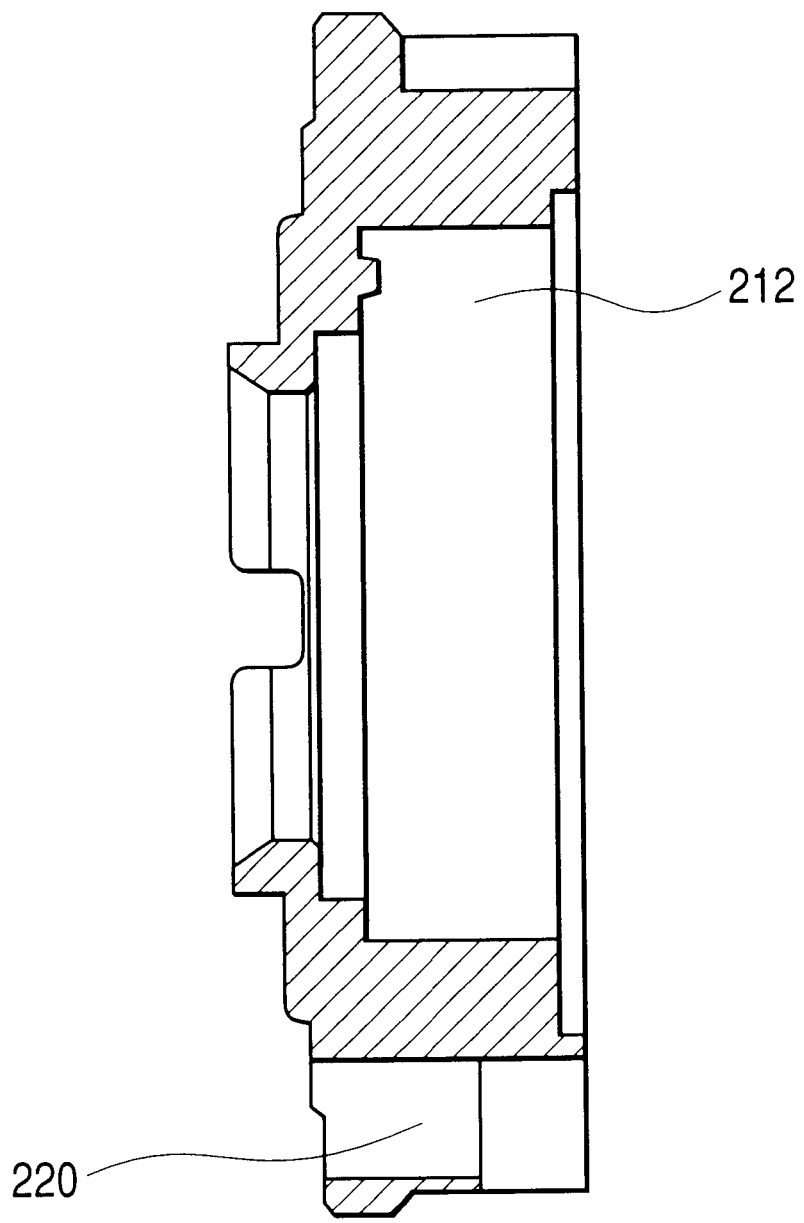
FIG. 7 is a sectional view taken along the line VII—VII in FIG. 6.
Figure 8:
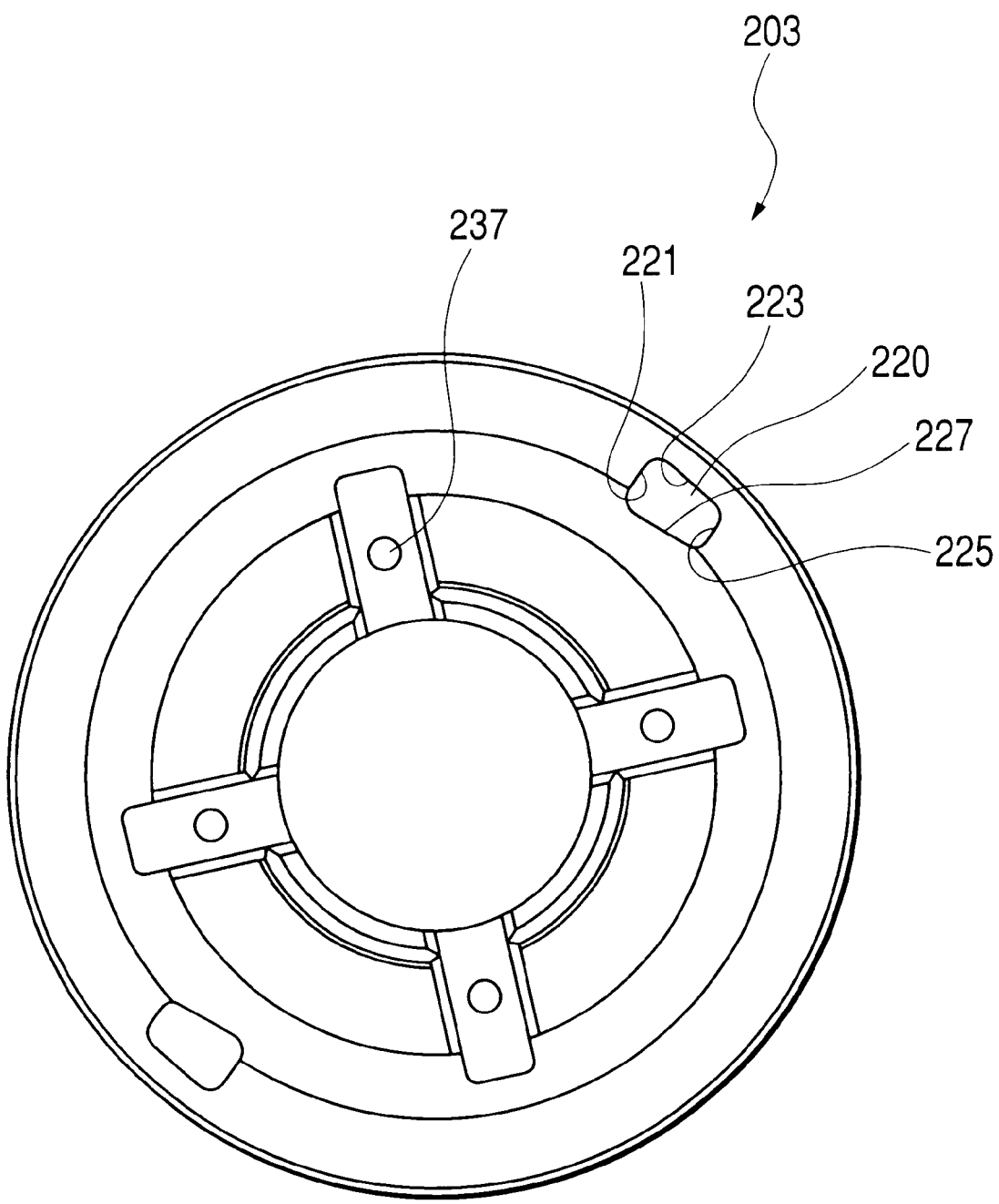
FIG. 8 is a rear view of the outer race of FIG. 6.

FIG. 6 is a front view of the outer race, FIG. 7 is a sectional view taken along the line VII—VII, and FIG. 8 is a rear view of the outer race 203. As shown, similar to the outer race 3, the outer race 203 is provided with a plurality of first recessed portions 219 adapted to contain damper springs and disposed equidistantly along a circumferential direction. Each of the first recessed portions 219 is provided at its circumferential one end with an assembling window 220 spaced apart from an outer peripheral surface radially inwardly by a predetermined distance. Each assembling window 220 passes through the outer race 203 in an axial direction and is defined by surfaces 221, 223, 225 and 227. These surfaces are interconnected via curved surfaces having a predetermined radius of curvature. Further, the surfaces 221, 225 extend in the radial direction, and a radial length of the surface 221 is set to be greater than that of the surface 225. Further, the assembling window 220 extends from one end of the first recessed portion 219 by a predetermined distance in the circumferential direction and is configured so that a width of the assembling window is increased as the window is away from the one end.

Further, as shown in FIGS. 7 and 8, each pocket 212 for containing a torque transmitting member is provided with a hole 237 extending through in the axial direction and communicated with the exterior. The hole 237 acts as a lubricating oil flow path and a foreign matter discharging path.

By forming the assembling windows 220 as shown in the afore-mentioned another embodiment, in comparison with the assembling windows 20 of the outer race 3 in the previous embodiment, the stress generated on the outer race can be dispersed more uniformly.

Figure 9:
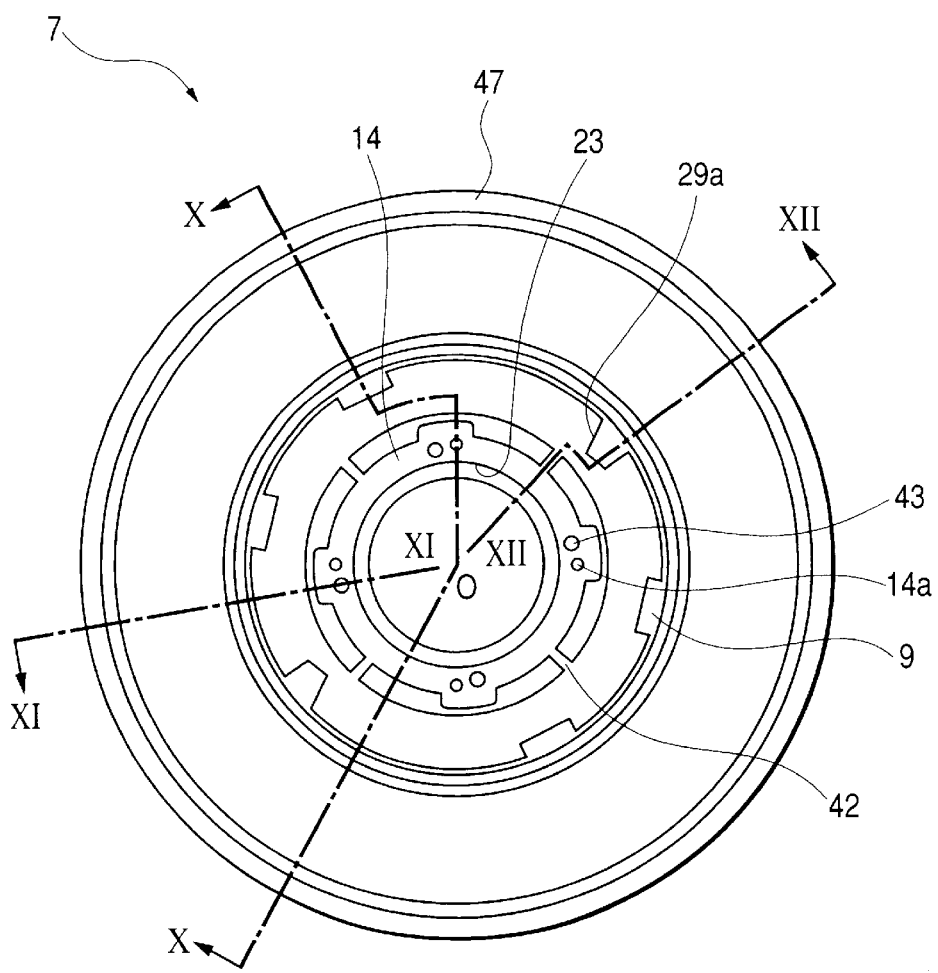
FIG. 9 is a front view of a vane wheel of FIG. 1.
Figure 10:
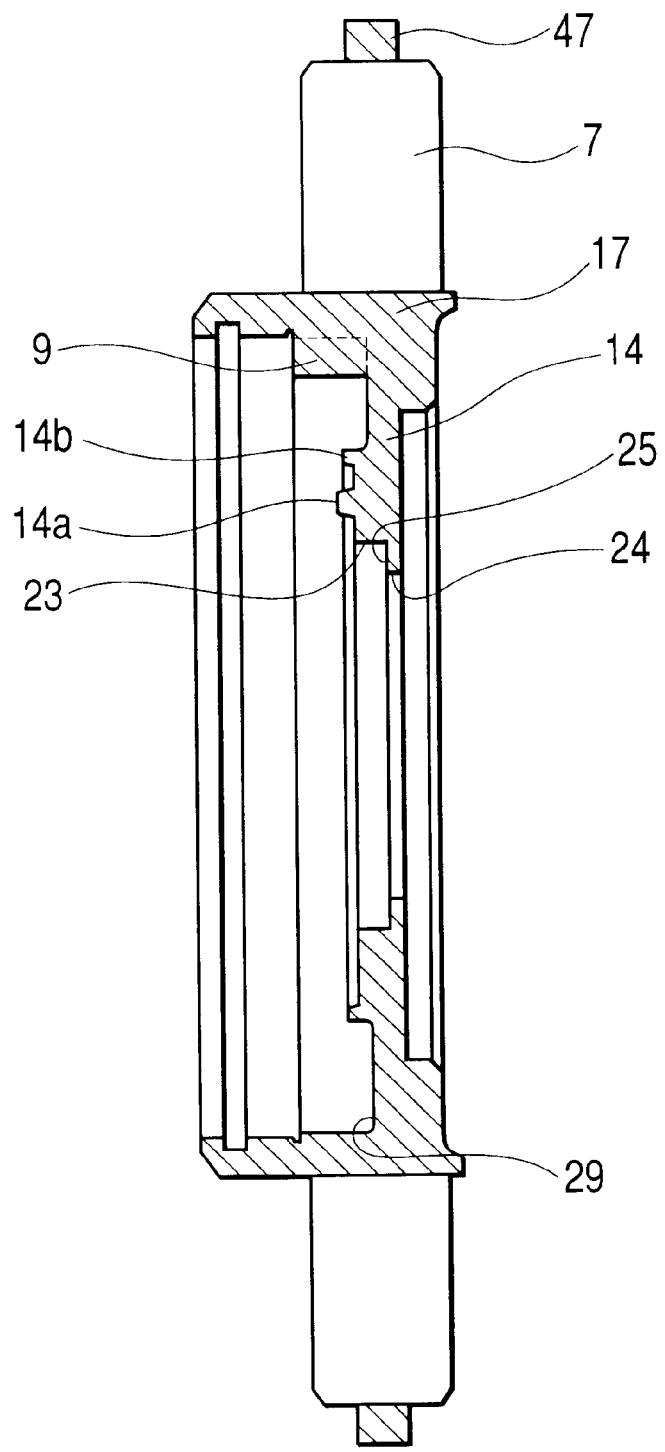
FIG. 10 is a sectional view taken along the line X-O-X in FIG. 9.
Figure 11:
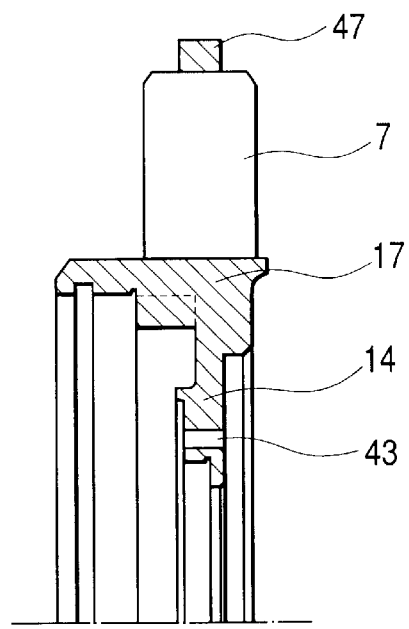
FIG. 11 is a sectional view taken along the line XI—XI in FIG. 9.
Figure 12:
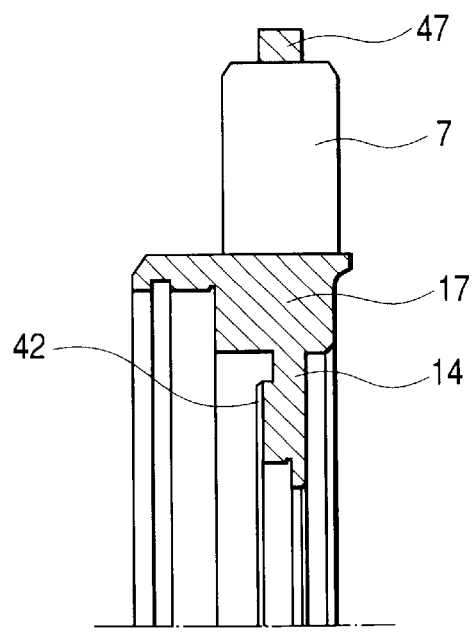
FIG. 12 is a sectional view taken along the line XII—XII in FIG. 9.

Next, a construction of the vane wheel 7 will be explained with reference to FIGS. 9 to 12. FIG. 9 is a front view of the vane wheel 7, FIG. 10 is a sectional view taken along the line X-O-X in FIG. 9, FIG. 11 is a sectional view taken along the line XI—XI in FIG. 9, and FIG. 12 is a sectional view taken along the line XII—XII in FIG. 9.

The vane wheel 7 mainly comprises an outer peripheral outer ring 47, an inner peripheral inner ring 17, a vane portion provided between the rings, and an inner diameter portion 14 extending from the inner ring 17 radially inwardly.

The inner diameter portion 14 is provided with holes 43 extending through in the axial direction and projections 14a for supporting the torque transmitting members, which hole/projection pairs are disposed equidistantly along the circumferential direction. Further, discharge grooves 42 are formed in the vane wheel of the stator 1 equidistantly along the circumferential direction. Accordingly, the foreign matters accumulated in the stress relieving recesses 30 can be discharged out of the stator through the discharged grooves 42.

The construction of the vane wheel 7 will be further explained with reference to FIG. 10. A thick portion is formed at a tip end of the inner diameter portion 14 of the inner ring 17, and shoulder portions 14b for engaging by the inner diameter portion 59 (refer to FIG. 5) of the outer race 3 are formed on the thick portion. Projections 14a for supporting the pawl members are provided at an inner diameter side of the thick portion.

Further, the inner ring 17 is provided at its inner peripheral surface with the projections 9 connected to the inner diameter portion 14, and each projection includes a radially extending surface and an axially extending surface (looked at in a sectional view).

The inner periphery of the inner diameter portion 14 includes a large diameter portion 23 and a small diameter portion 24, and the large diameter portion 23 and the small diameter portion 24 are interconnected via a radially extending surface 25. The large diameter portion 23 and the surface 25 act as a radial bearing surface and a thrust bearing surface, respectively, with respect to the inner race 2 so that the inner race can be slidingly moved.

Now, the holes 43 of the vane wheel 7 will be explained with reference to FIG. 11. FIG. 11 is a sectional view taken along the line XI—XI in FIG. 9. The holes 43 (refer to FIG. 9) disposed equidistantly along the circumferential direction extend through in the axial direction to be communicated with the interior of the one-way clutch. With this arrangement, the holes 43 act as the lubricating oil glow paths and the foreign matter discharging paths.

Next, the vane wheel 7 will be described with reference to FIG. 12. FIG. 12 is a sectional view of the vane wheel, taken along the line XII—XII in FIG. 9. In FIG. 12, a section of a portion of the inner ring 17 where the recessed portion for containing the damper spring is not provided is shown. Further, radial discharge paths 42 as grooves are formed in an end surface of the thick portion of the inner diameter portion 14 against which the outer race 3 abut, and the foreign matters such as metallic powder are discharged through these grooves.

Next, a method for assembling the one-way clutch 15 the vane wheel 7 will be explained with reference to FIGS. 13A to 15B.

Figure 13A:
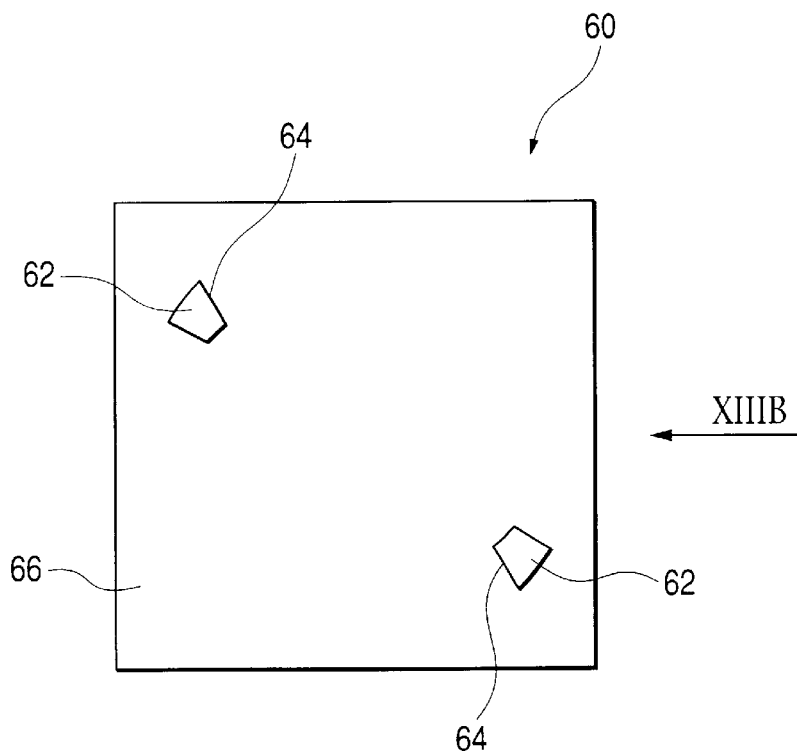
FIG. 13A is a top view of a tool.
Figure 13B:
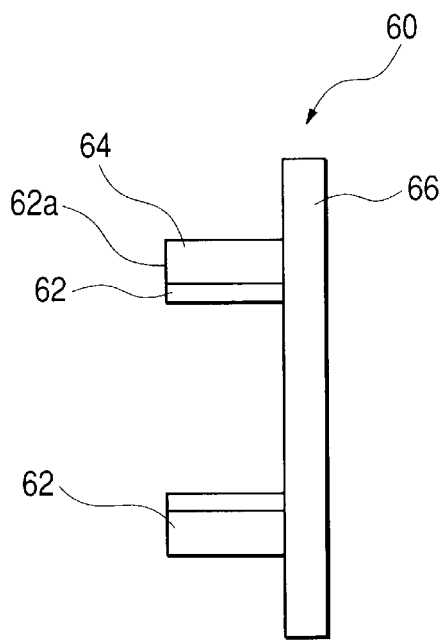
FIG. 13B is a side view looked at from a direction shown by the arrow XIIIB in FIG. 13A.

FIGS. 13A and 13B show a tool 60 for assembling the ratchet one-way clutch 15 to the vane wheel 7, where FIG. 13A is a top view and FIG. 13B is a side view looked at from a direction shown by the arrow XIIIB in FIG. 13A.

As shown in FIGS. 13A and 13B, the tool (jig) 60 comprises a plate-shaped base plate 66, and a set of posts 62 protruded from one of surfaces of the plate. Each post 62 extends substantially in perpendicular to the base plate 66.

Further, each post 62 has surfaces extending in perpendicular to the base plate 66, and one of such surfaces is a spring supporting surface 64 for supporting one end of the damper spring 8. Further, each post 62 is configured to have a cross-section (perpendicular to a longitudinal direction) complementary to the assembling window 20 of the outer race 3.

Figure 14:
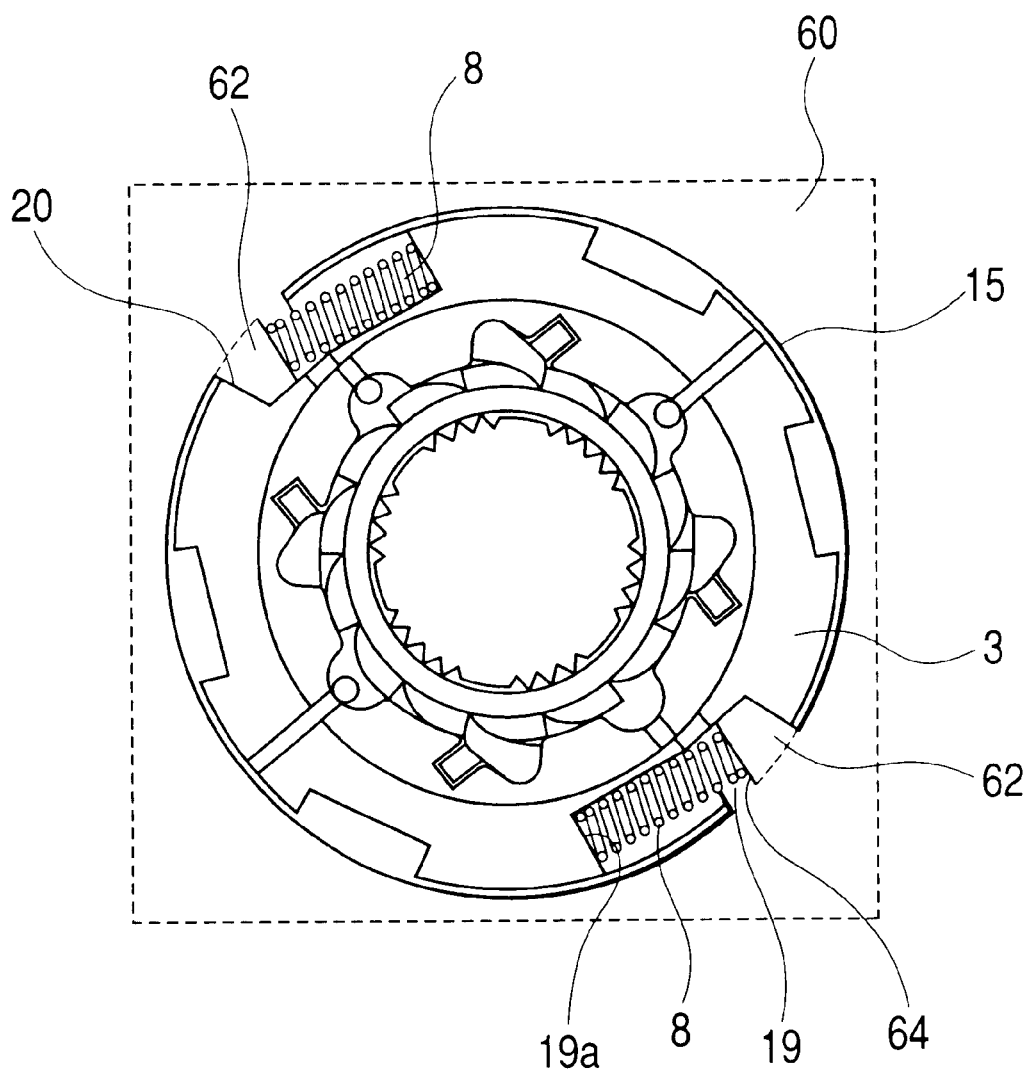
FIG. 14 is a view showing a condition that the one-way clutch is set in the tool.

FIG. 14 shows a condition that the ratchet one-way clutch 15 was set on the tool 60. The posts 62 are fitted into the assembling windows 20 opposed in the radial direction.

In a condition that the one-way clutch 15 is set on the tool 60, the damper springs 8 extend in the circumferential direction, and one end of each damper spring abuts against the surface 19a of the corresponding first recessed portion 19 formed in the outer race 3 and the other end abuts against the spring supporting surface 64.

Incidentally, a circumferential length between the spring supporting surface 64 and the surface 19a is selected to be smaller than a circumferential length between a side wall 29a of the vane wheel 7 and the surface 19a (refer to FIG. 9) in a condition that the one-way clutch 15 is fitted on the vane wheel 7. Namely, in the condition that the one-way clutch 15 is set on the tool 60, each damper spring 8 is further contracted in comparison with the damper spring in a condition that the spring is fitted on the vane wheel 7.

Figure 15A:
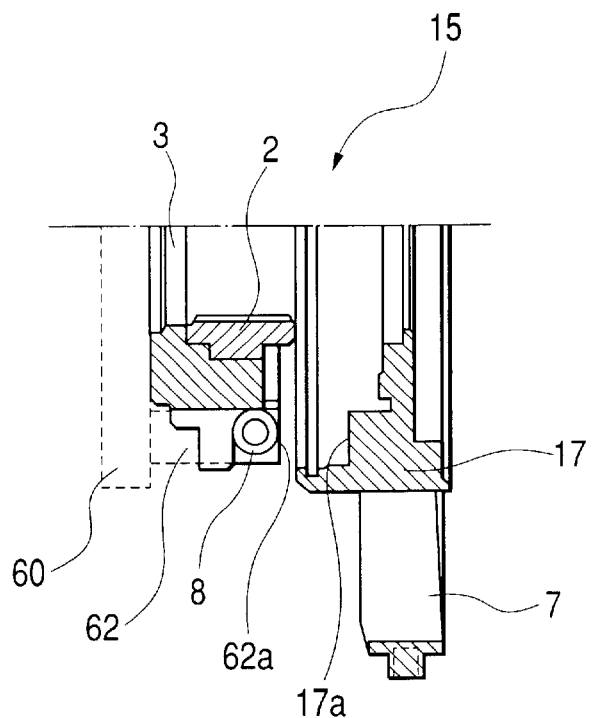
FIGS. 15A and 15B are views showing steps for mounting the one-way clutch set in the tool to the vane wheel.
Figure 15B:
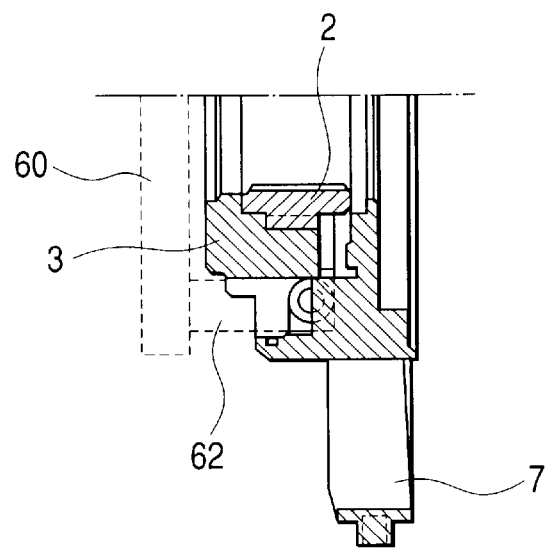
Figure 16:
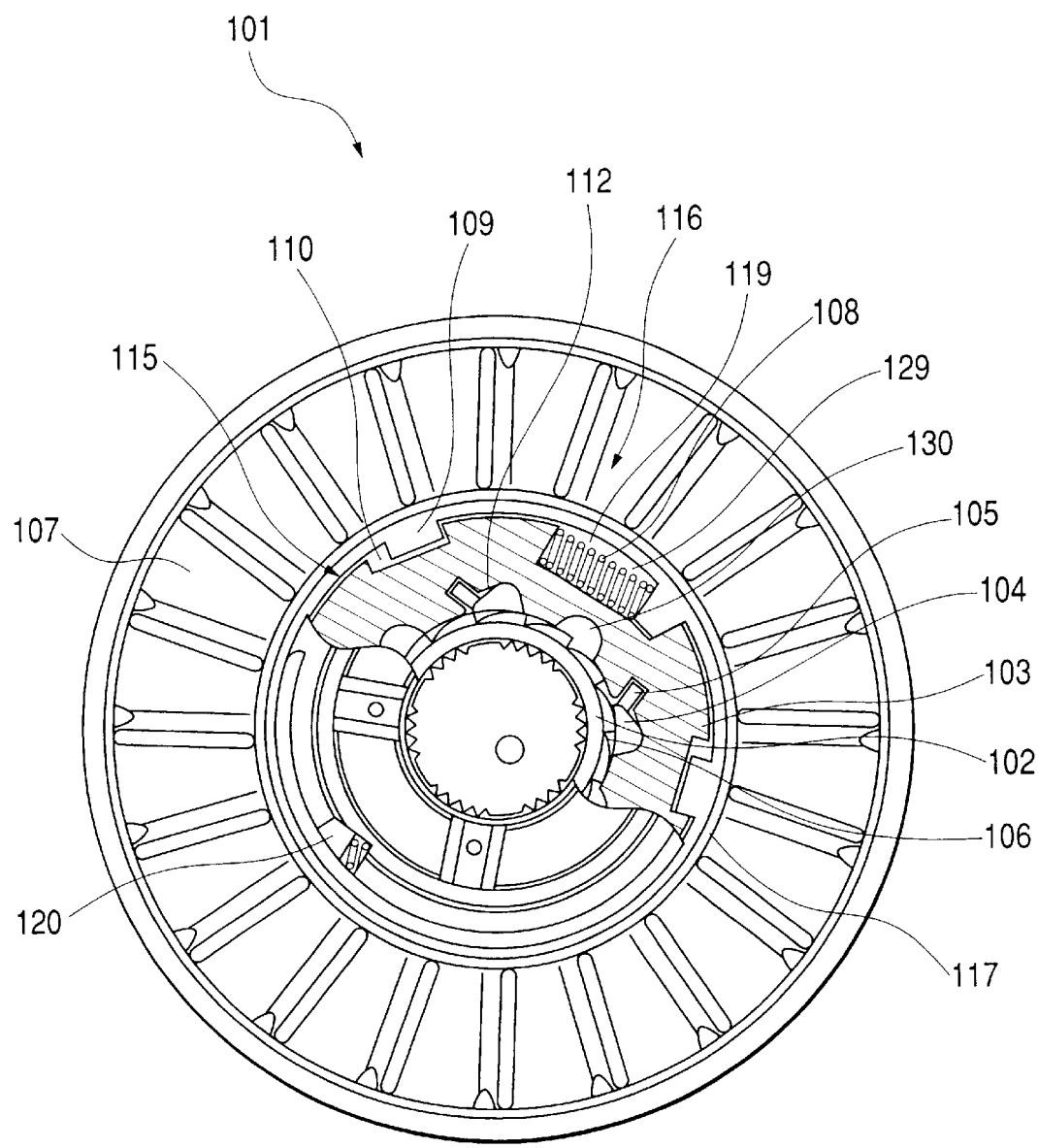
FIG. 16 is a front view of a conventional stator.

FIGS. 15A and 15B is sectional views similar to FIG. 2 and show a lower half thereof, illustrating steps for fitting the ratchet one-way clutch 15 set on the tool 60 into the vane wheel 7 and for removing the tool 60.

As shown in FIG. 15A, when the one-way clutch 15 secured to the tool 60 is being fitted onto the vane wheel 7, an end face 62a of each post 62 abuts against an axial end face 17a of the inner ring 17. Thereafter, when the one-way clutch 15 is shifted toward the interior of the vane wheel (right in FIG. 15A), one end of the damper spring abutting against the spring supporting surface 64 rides over the side wall 29a of the recessed portion 29.

As mentioned above, in a case where the one end of the damper spring 8 abuts against the spring supporting surface 64, since the damper spring is further contracted in comparison with a case where the damper spring abuts against the side wall 29a (refer to FIG. 9), when the damper spring rides over the side wall 29a from the spring supporting surface 64, the damper spring is slightly extended, thereby acting an urging force against the post 62. By the urging force acting on the post 62, the tool 60 is pushed out radially outwardly (left in FIG. 15A), thereby facilitating the removal of the tool 60 from the one-way clutch 15.

Incidentally, the present invention can be embodied as various aspects without departing from it essential feature. Thus, it should be noted that the above-mentioned embodiment is a merely example but does not limit the present invention.

In the one-way clutch having the construction according to the present invention and the stator using such a one-way clutch, the foreign matters such as the metallic powder generated within the clutch or the stator can be discharged out of the clutch or the stator through the discharge path. Thus, malfunction of the ratchet one-way clutch and the stator using such a one-way clutch can be prevented to extend service lives thereof.

In the one-way clutch incorporated into the stator of the present invention, since any bush does not exist between the inner race and the outer race and the assembling windows are provided in the outer race, the stator assembling operation can be facilitated.

What is claimed is:

1. A ratchet one-way clutch comprising:
   an inner race;
   an outer race disposed for rotation relative to said inner race and concentric with said inner race;
   a recessed portion formed in one of an outer periphery of said inner race and an inner periphery of said outer race along a circumferential direction;
   a pawl member provided on the other of the outer periphery of said inner race and the inner periphery of said outer race and adapted to be fitted into said recessed portion;
   a spring that biases said pawl member toward said recessed portion; and
   a first pocket that contains said pawl member and said spring; and wherein
   a discharge path is formed in said outer race wherein said discharge path is a groove extending in a radial direction relative to said outer race.

2. A ratchet one-way clutch according to claim 1, wherein said discharge path communicates with a stress relieving recess provided in the inner periphery of said outer race.

3. A ratchet one-way clutch according to claim 2, wherein said discharge path communicates with a second pocket that contains a damper spring or a groove formed in an outer peripheral surface of said outer race.

4. A ratchet one-way clutch according to claim 1, wherein said discharge path is a hole passing through said outer race in an axial direction.

5. A ratchet one-way clutch according to claim 4, said discharge path communicates with a second pocket that contains a damper spring or a groove formed in an outer peripheral surface of said outer race.

6. A ratchet one-way clutch according to claim 1, wherein said outer race is made of aluminium.

7. A stator using a ratchet one-way clutch according to claim 6.

8. A stator according to claim 7, further comprising a vane wheel having a discharge path.

9. A stator according to claim 8, wherein said discharge path is a hole passing through said vane wheel in an axial direction.

10. A stator using a ratchet one-way clutch according to claim 1.

11. A stator according to claim 10, further comprising a vane wheel having a discharge path.

12. A stator according to claim 11, wherein said discharge path is a hole passing through said vane wheel in an axial direction.

13. A ratchet one-way clutch according to claim 1, wherein said discharge path communicates with a second pocket that contains a damper spring or a groove formed in an outer peripheral surface of said outer race.

14. A ratchet one-way clutch comprising:
   an inner race;
   an outer race disposed for rotation relative to said inner race and concentric with said inner race;

a recessed portion formed in one of an outer periphery of said inner race and an inner periphery of said outer race along a circumferential direction;

a pawl member provided on the other of the outer periphery of said inner race and the inner periphery of said outer race and adapted to be fitted into said recessed portion;

a spring that biases said pawl member toward said recessed portion;

a first pocket that contains said pawl member and said spring; and a second pocket formed in an outer periphery of said outer race and adapted to contain a damper spring; and wherein said second pocket is provided with an assembling window passing through said outer race in an axial direction.

* * * * *